United States Patent
Kapoor et al.

(10) Patent No.: US 11,224,095 B2
(45) Date of Patent: Jan. 11, 2022

(54) ADAPTIVE OPERATION OF A CONTROL CHANNEL OF A RADIO FREQUENCY SITE CONTROLLER

(71) Applicant: MOTOROLA SOLUTIONS, INC., Chicago, IL (US)

(72) Inventors: Anuj Kapoor, Palatine, IL (US); Shivakumar Bangalore Ramu, Weston, FL (US); Nadeem Z. Kureishy, Huntley, IL (US); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 84 days.

(21) Appl. No.: 16/811,988

(22) Filed: Mar. 6, 2020

(65) Prior Publication Data
US 2021/0282222 A1    Sep. 9, 2021

(51) Int. Cl.
| | |
|---|---|
| *H04W 84/08* | (2009.01) |
| *H04L 5/00* | (2006.01) |
| *H04W 74/04* | (2009.01) |
| *H04W 88/08* | (2009.01) |
| *H04W 72/04* | (2009.01) |
| *H04B 17/318* | (2015.01) |
| *H04W 16/14* | (2009.01) |

(52) U.S. Cl.
CPC .......... *H04W 84/08* (2013.01); *H04B 17/318* (2015.01); *H04L 5/0053* (2013.01); *H04W 16/14* (2013.01); *H04W 72/0446* (2013.01); *H04W 74/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 4,577,315 A | 3/1986 | Otsuka | |
| 4,860,005 A | 8/1989 | DeLuca et al. | |
| 5,128,938 A | 7/1992 | Borras | |
| (Continued) | | | |

FOREIGN PATENT DOCUMENTS

JP    3715197 B2    11/2005

OTHER PUBLICATIONS

Barden, R., "AeroFlex, A passion for preformance" Oart Bi, 46891/942, Issue 1, May 2006.

*Primary Examiner* — Tri H Phan
(74) *Attorney, Agent, or Firm* — Michael Best & Friedrich LLP

(57) ABSTRACT

One example radio frequency (RF) site controller is configured to communicate with a first communication device over a control channel to establish a traffic channel over which the first communication device is configured to communicate with a second communication device. The RF site controller may control the control channel to switch between operating in (i) a keyed state (in other words a full-power state) for a first dynamic period of time and (ii) a de-keyed state (in other words, a lower-powered state) for a second dynamic period of time. At least one of the first dynamic period of time and the second dynamic period of time may be based on a characteristic of at least one of a group consisting of a coverage area being serviced by the RF site controller and one or more communication devices being serviced by the RF site controller.

20 Claims, 3 Drawing Sheets

(56) References Cited

U.S. PATENT DOCUMENTS

| | | |
|---|---|---|
| 6,584,330 B1 | 6/2003 | Ruuska |
| 7,729,701 B2 * | 6/2010 | Wiatrowski ...... H04W 52/0206 |
| | | 455/437 |
| 8,194,576 B2 * | 6/2012 | Kholaif ............. H04W 52/0216 |
| | | 370/310 |
| 8,874,136 B2 * | 10/2014 | McDonald ........ H04W 52/0206 |
| | | 455/456.1 |
| 2012/0008512 A1 | 1/2012 | Wahlqvist et al. |

* cited by examiner

ADAPTIVE OPERATION OF A CONTROL CHANNEL OF A RADIO FREQUENCY SITE CONTROLLER

BACKGROUND OF THE INVENTION

Radio frequency (RF) site controllers of a communication network (for example, a trunked radio communication network) may continuously transmit outbound signaling messages (for example, outbound signaling packets (OSPs)) over a control channel for receipt by communication devices configured to communicate over the communication network. The communication devices that communicate over the communication network may continuously monitor for the OSPs transmitted by a RF site controller within communication range of the communication devices. A communication device may use information included in the OSPs to control resources of the communication device in order to be able to communicate over the communication network, for example, with other communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
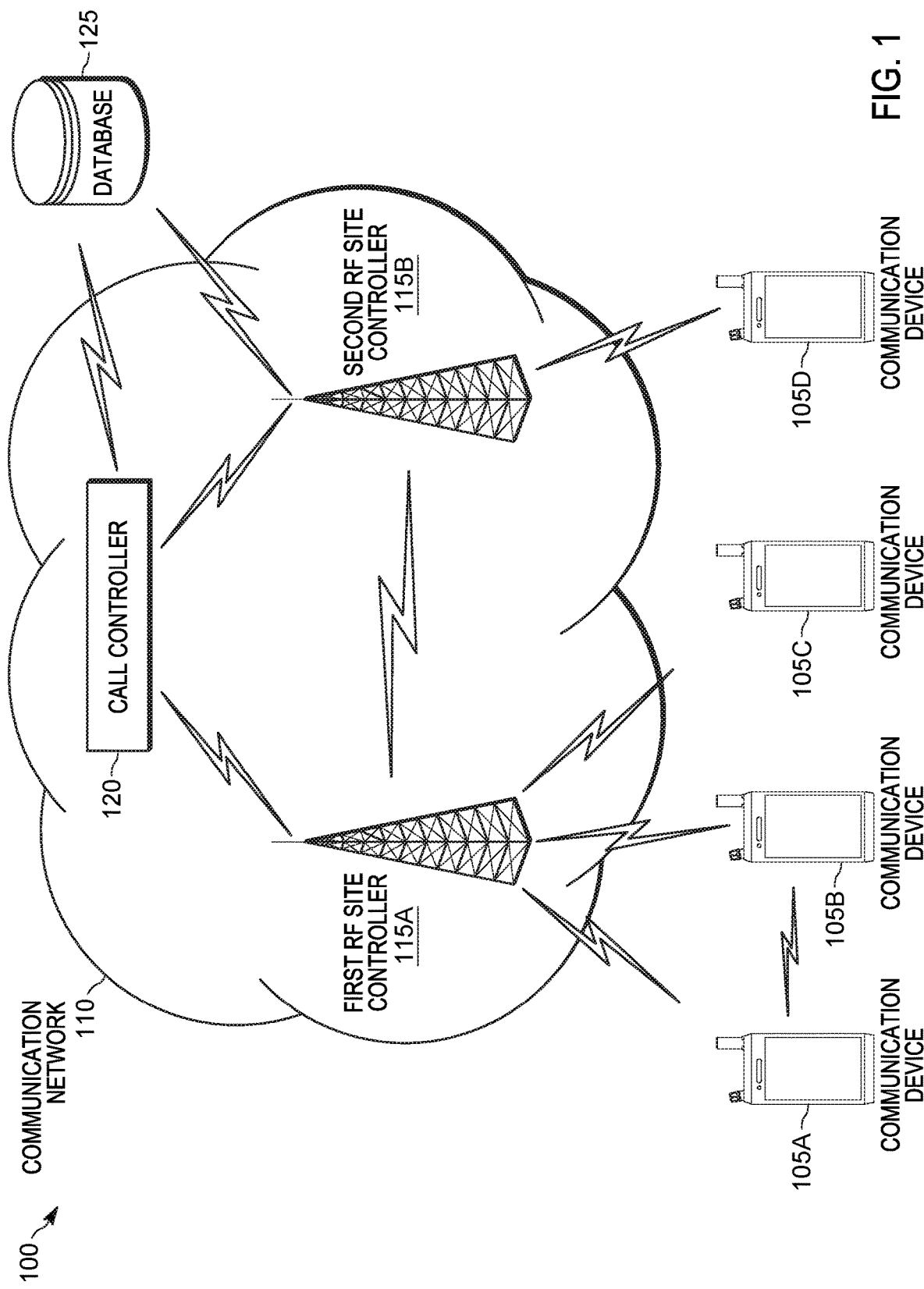
FIG. 1 is a diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As explained above, radio frequency (RF) site controllers of a communication network (for example, a trunked radio communication network) may continuously transmit outbound signaling messages (for example, outbound signaling packets (OSPs)) over a control channel for receipt by communication devices within a coverage area of the RF site controller. A communication device may use information included in the OSPs to control resources of the communication device in order to be able to communicate over the communication network, for example, with other communication devices. However, such continuous communication of OSPs over the control channel may be disadvantageous in many situations such as when new activity is not occurring within a coverage area of the RF site controller. For example, a RF site controller consumes power while continuously transmitting OSPs even when communication devices in the coverage area have been in the coverage area for some time and are not engaging in new activity (e.g., communication devices are not requesting to engage in a call or requesting to end an ongoing call). Because the communication devices are not engaging in new activity, the communication devices may not require continuous OSPs to be transmitted by the RF site controller in order to properly access the communication network. Accordingly, there is a technological problem with RF site controllers of communication networks in that the RF site controllers may consume more power than is necessary to allow the communication network and communication devices associated with the communication network to function properly.

To address this technological problem, disclosed are, among other things, a process, device, and system to adaptively operate a control channel of a RF site controller to reduce power consumption/save energy. For example, the RF site controller sends OSPs in accordance with a duty cycle based on a characteristic of at least one of a group consisting of (i) a coverage area being serviced by the RF site controller and (ii) one or more communication devices being serviced by the RF site controller. The RF site controller may repeat the process of (i) broadcasting OSPs for a first dynamic time interval and (ii) refraining from broadcasting OSPs for a second dynamic time interval. Due to the RF site controller periodically refraining from broadcasting OSPs for the second dynamic time interval, the RF site controller consumes less power/saves energy compared to RF site controllers that continuously broadcast OSPs. Additionally, the improved RF site controller reduces its power consumption/saves energy without negatively affecting the functionality of the communication network or the communication devices associated with the communication network. In fact, the communication devices configured to communicate with the RF site controller may also experience reductions in power consumption from receiving less OSPs and from being able to periodically reduce or eliminate OSP monitoring capabilities (for example, used for received signal strength indication (RSSI) sampling) during the second dynamic time interval when it is known that OSPs will not be transmitted by the RF site controller.

One embodiment provides a radio frequency (RF) site controller that may include a first transceiver, a first antenna, and a first electronic processor. The RF site controller may be configured to communicate with a first communication device over a control channel to establish a traffic channel over which the first communication device is configured to communicate with a second communication device. The first electronic processor may be configured to control the RF site controller such that the control channel operates in either (i) a keyed state in which outbound signaling messages are broadcast by the RF site controller via the first transceiver and the first antenna over the control channel and in which inbound signaling messages from the first communication device are receivable by the RF site controller over the control channel, or (ii) a de-keyed state in which the outbound signaling messages are not transmitted by the RF site controller over the control channel and in which the inbound signaling messages from the first communication device are receivable by the RF site controller over the control channel. The first electronic processor may be configured to (a) operate the control channel in the keyed state, and (b) determine that new activity has not occurred on the control channel for a first dynamic period of time. The first electronic processor may also be configured to (c) in response to determining that new activity has not occurred on the control channel for the first dynamic period of time, transmit, via the first transceiver and the first antenna, an outbound de-keying notification message to the first communication device over the control channel, and operate the control channel in the de-keyed state for a second dynamic period of time. The first electronic processor may also be configured to (d) in response to determining that the second dynamic period of time has elapsed, operate the control channel in the keyed state. At least one of the first dynamic period of time and the second dynamic period of time may be based on a characteristic of at least one of a group consisting of a coverage area being serviced by the RF site controller and one or more communication devices being serviced by the RF site controller.

Another embodiment provides a method of operating a radio frequency (RF) site controller. The method may include operating, with a first electronic processor of the RF site controller, a control channel of the RF site controller in a keyed state in which outbound signaling messages are broadcast by the RF site controller via a first transceiver and a first antenna over the control channel to a first communication device and in which inbound signaling messages from the first communication device are receivable by the RF site controller over the control channel. The first electronic processor may be configured to establish a traffic channel over which the first communication device is configured to communicate with a second communication device based on communication with the first communication device over the control channel. The method may also include determining, with the first electronic processor, that new activity has not occurred on the control channel for a first dynamic period of time. The method may also include in response to determining that new activity has not occurred on the control channel for the first dynamic period of time, transmitting, via the first transceiver and the first antenna, an outbound de-keying notification message to the first communication device over the control channel, and operating the control channel in a de-keyed state for a second dynamic period of time. When the control channel is operated in the de-keyed state, the outbound signaling messages may not transmitted by the RF site controller over the control channel and the inbound signaling messages from the first communication device may be receivable by the RF site controller over the control channel. The method may further include in response to determining that the second dynamic period of time has elapsed, operating, with the first electronic processor, the control channel in the keyed state. At least one of the first dynamic period of time and the second dynamic period of time may be based on a characteristic of at least one of a group consisting of a coverage area being serviced by the RF site controller and one or more communication devices being serviced by the RF site controller.

Another embodiment provides a communication system including a radio frequency (RF) site controller that may include a first transceiver, a first antenna, and a first electronic processor. The RF site controller may be configured to communicate with a first communication device over a control channel to establish a traffic channel over which the first communication device is configured to communicate with a second communication device. The first electronic processor may be configured to control the RF site controller such that the control channel operates in either (i) a keyed state in which outbound signaling messages are broadcast by the RF site controller via the first transceiver and the first antenna over the control channel and in which inbound signaling messages from the first communication device are receivable by the RF site controller over the control channel, or (ii) a de-keyed state in which the outbound signaling messages are not transmitted by the RF site controller over the control channel and in which the inbound signaling messages from the first communication device are receivable by the RF site controller over the control channel. The first electronic processor may be configured to (a) operate the control channel in the keyed state, and (b) determine that new activity has not occurred on the control channel for a first dynamic period of time. The first electronic processor may also be configured to (c) in response to determining that new activity has not occurred on the control channel for the first dynamic period of time, transmit, via the first transceiver and the first antenna, an outbound de-keying notification message to the first communication device over the control channel, and operate the control channel in the de-keyed state for a second dynamic period of time. The first electronic processor may also be configured to (d) in response to determining that the second dynamic period of time has elapsed, operate the control channel in the keyed state. At least one of the first dynamic period of time and the second dynamic period of time may be based on a characteristic of at least one of a group consisting of a coverage area being serviced by the RF site controller and one or more communication devices being serviced by the RF site controller. The outbound de-keying notification message may include the second dynamic period of time. The first communication device may include a second transceiver, a second antenna, and a second electronic processor. The second electronic processor may be configured to receive, via the second transceiver and the second antenna, the outbound de-keying notification message from the RF site controller. The second electronic processor may also be configured to in response to receiving the outbound de-keying notification message, store identification information of the control channel included in the outbound de-keying notification message, and prevent the first communication device from sampling for other RF site controllers during the second dynamic period of time.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

FIG. 1 is a diagram of a communication system 100 according to one example embodiment. In the example illustrated, the communication system 100 includes communication devices (for example, subscriber units (SUs)) 105A, 105B, 105C, and 105D. In the following description, when explaining how a single communication device functions, a reference to communication device 105 is used. It is not necessary, however, that the communication devices 105A through 105D are identical. The communication devices 105A through 105D are merely examples. In some embodiments, the communication system 100 may include more or fewer communication devices than illustrated in FIG. 1.

In some embodiments, the communication devices 105 communicate with each other over a communication network 110 including a first RF site controller 115A and a second RF site controller 115B (for example, by sending and receiving radio signals to and from an RF site controller 115). In the following description, when explaining how a single RF site controller functions (as explained in greater detail with respect to FIGS. 4 and 5), a reference to RF site controller 115 is used. The communication network 110 may include wireless and wired portions. All or parts of the communication network 110 may be implemented using various existing specifications or protocols. In some embodiments, the communication network 110 is implemented using a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the communication network 110 implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The communication network 110 may also include future developed networks. In some embodiments, the communication network 110 may also include a combination of the networks mentioned. In some embodiments, the communication devices 105 may communicate directly with each other using a communication channel or connection that is outside of the communication network 110. For example, as indicated in FIG. 1, the communication devices 105A and 105B may communicate directly with each other when they are within a predetermined distance from each other.

Although FIG. 1 shows two RF site controllers 115, in some embodiments, the communication network 110 may include more or fewer RF site controllers 115. Each of the RF site controllers 115 may control communication between one or more communication devices 105 within a predetermined area (for example, a coverage area of the RF site controller 115 at a respective site). The RF site controllers 115 may communicate with each other to relay messages to and from communication devices 105 located within a respective coverage area of each RF site controller 115.

Figures 3, 4:
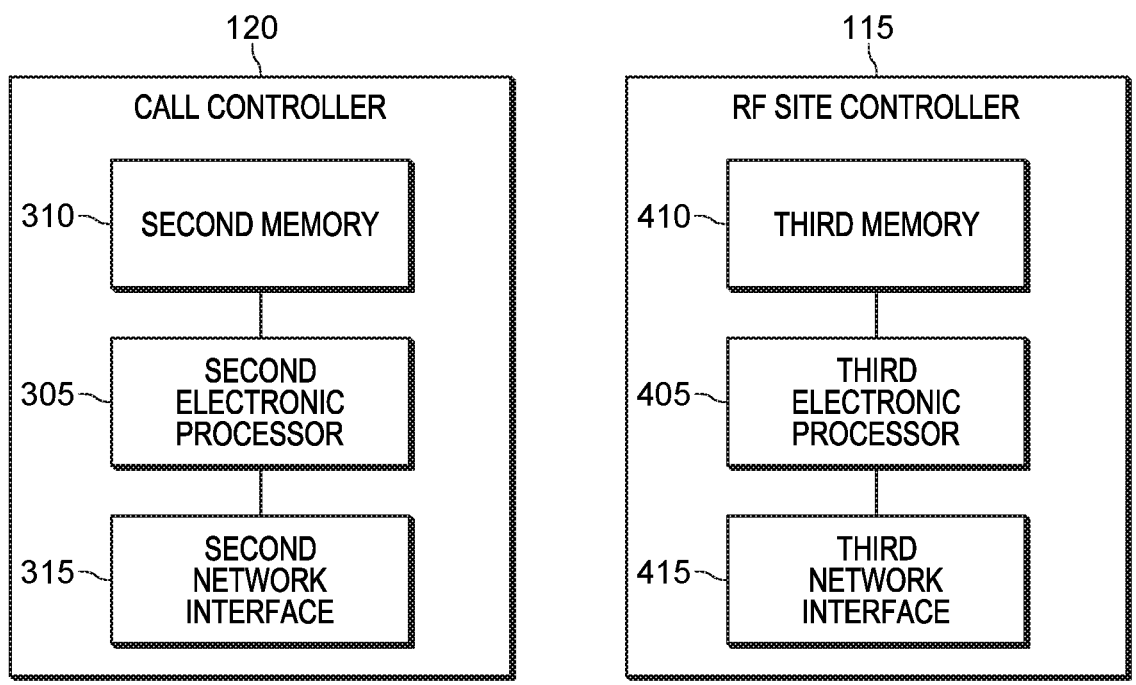
FIG. 3 is a diagram of a call controller included in the communication system of FIG. 1 according to one example embodiment.
FIG. 4 is a diagram of a radio frequency (RF) site controller included in the communication system of FIG. 1 according to one example embodiment.

The communication network 110 also includes a call controller 120. The call controller 120, described more particularly below with respect to FIG. 3, is communicatively coupled to the RF site controllers 115 and a database 125 to and from which the call controller 120 writes and reads data. The database 125 may be a database housed on a suitable database server communicatively coupled to and accessible by the call controller 120. As shown in FIG. 1, in some embodiments, the database 125 is part of a cloud-based database system (for example, a data warehouse) external to the communication network 110 and accessible by the call controller 120 over one or more wired or wireless networks. In other embodiments, the database 125 is considered part of the communication network 110. For example, all or part of the database 125 may be locally stored on the call controller 120. In some embodiments, the database 125 electronically stores talkgroup data (for example, data designating talkgroup assignments for the communication devices 105 and the like), communication device data (for example, model, configuration, and user characteristic information for the communication devices 105), and contextual condition data (for example, telemetry and other data relating to the communication devices 105 and users of the communication devices 105 transmitted by the communication devices 105 to the call controller 120). In some embodiments, the call controller 120 communicates with each RF site controller 115 to control communication between respective communication devices 105 controlled by each RF site controller 115. In some embodiments, one or more RF site controllers 115 communicate directly with the database 125 as shown in FIG. 1 between the second RF site controller 115B and the database 125.

In some embodiments, the call controller 120 may be a central network equipment or a dispatch controller used by a public safety agency such as a fire department or police department. In other embodiments, the call controller 120 may be other network equipment used by an agency, network administrator, or telecommunications provider.

As illustrated in FIG. 1, the communication device 105 may be a handheld communication device, for example, a mobile telephone or other portable communication device, mobile radio, laptop computer, tablet computer, smart watch or other smart wearable, and may be located in or be a part of a drone or unmanned aerial vehicle, or may be another device configured to communicate over the network 110. In some embodiments, the communication device 105 may be a handheld radio carried by a public safety officer or first responder, such as a police officer. In some embodiments, the communication device 105 may be a mobile communication device mounted in or on a vehicle (for example, a police vehicle, an ambulance, or the like). In some embodiments, the communication device 105 may be a device maintained, for example, at a call center or public safety command center (for example, a desktop computer).

FIG. 1 illustrates only one example embodiment of the communication system 100. In other embodiments, the system 100 may include more or fewer components and may perform functions that are not explicitly described herein. Further, although the system 100 is shown as a centralized system, the system 100 may also be implemented as a decentralized system in which the functionality of the call controller 120 is accomplished within one or more of the communication devices 105, one or more of the RF site controllers 115, or in other network infrastructure.

Figure 2:
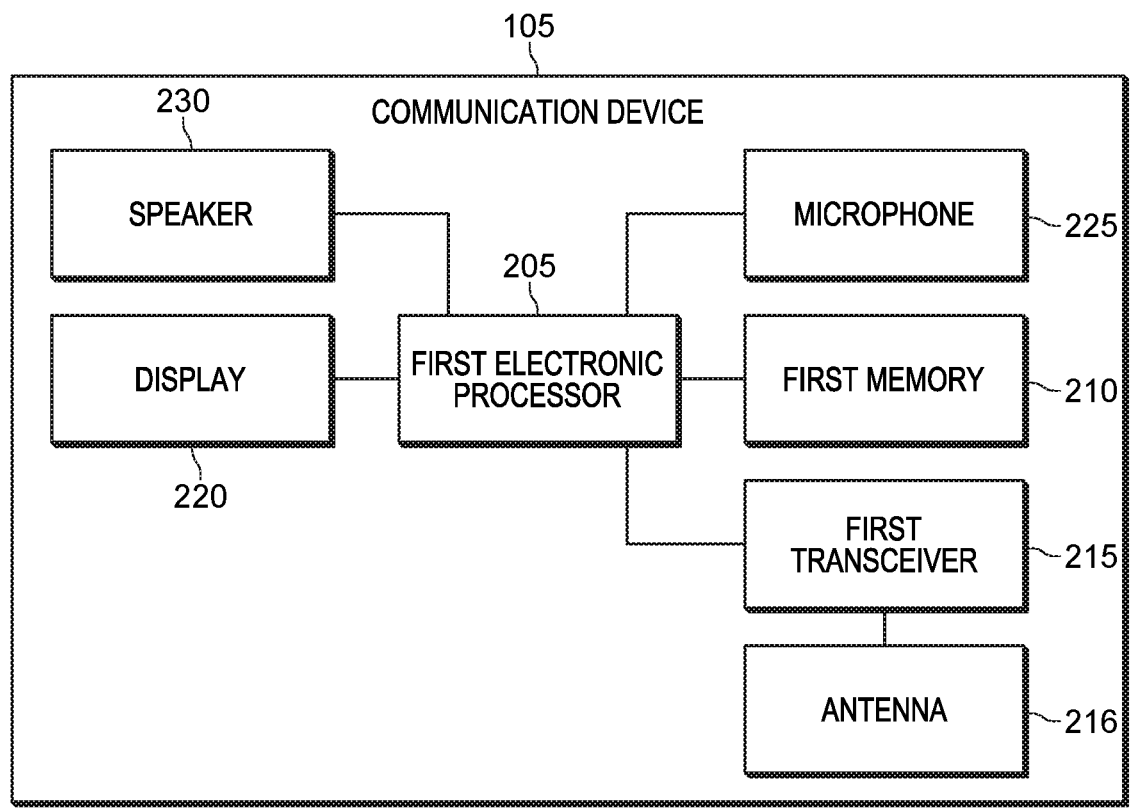
FIG. 2 is a diagram of a communication device included in the communication system of FIG. 1 according to one example embodiment.

FIG. 2 is a block diagram of a communication device 105 of the communication system 100 according to one embodiment. In the example shown, the communication device 105 includes a first electronic processor 205 (for example, a microprocessor or another electronic device). The first electronic processor 205 may include input and output interfaces (not shown) and be electrically connected to a first memory 210, a first transceiver 215 including or connected to an antenna 216 (the combination of which may be referred to as a first network interface), a display 220, a microphone 225, and a speaker 230. In some embodiments, the communication device 105 may include fewer or additional components in configurations different from that illustrated in FIG. 2. For example, in some embodiments, the communication device 105 also includes one or more of a camera, a location component (for example, a global positioning system (GPS) receiver), and a push-to-talk (PTT) mechanism/button. In some embodiments, the communication device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The combination of the first transceiver 215 and the antenna 216 (for example, the first network interface) sends and receives data to and from the network 110. For example, the first transceiver 215 is a wireless communication transceiver for wirelessly communicating with the network 110. Alternatively or in addition, the first network interface may include a connector or port for receiving a wired connection to the network 110, such as an Ethernet cable. The first electronic processor 205 receives electrical signals representing sound from the microphone 225 and may communicate information relating to the electrical signals over the network 110 through the first transceiver 215 and the antenna 216 to other devices, for example, to another communication device 105. Similarly, the first electronic processor 205 may output data received from the network 110 via the first network interface, for example from another communication device 105, through the speaker 230, the display 220, or a combination thereof.

FIG. 3 is a block diagram of the call controller 120 according to one embodiment. In the example illustrated, the call controller 120 is a computer that includes a second electronic processor 305, an input/output interface (not shown), a second memory 310, and a second network interface 315 (for example, including a transceiver and an antenna). These components are similar to those described above with respect to the communication device 105 and perform similar general functions. In some embodiments, the call controller 120 may include fewer or additional components in configurations different from that illustrated in FIG. 3. For example, in some embodiments, the call controller 120 also includes a display and/or a microphone similar to that described above with respect to the communication device 105. In some embodiments, the call controller 120 performs additional functionality than the functionality described herein. In some embodiments, the call controller 120 communicates with each RF site controller 115 to control and/or influence operation thereof as explained in greater detail below.

FIG. 4 is a block diagram of the RF site controller 115 according to one embodiment. In the example illustrated, the RF site controller 115 is a computer that includes a third electronic processor 405, an input/output interface (not shown), a third memory 410, and a third network interface 415. These components are similar to those described above with respect to the communication device 105 and perform similar general functions. In some embodiments, the RF site controller 115 may include fewer or additional components in configurations different from that illustrated in FIG. 4. In some embodiments, the RF site controller 115 performs additional functionality than the functionality described herein. In some embodiments, the RF site controllers 115 control communication between the communication devices 105 over the communication network 110.

In some embodiments, the call controller 120 and/or the RF site controller 115 (in particular, their respective electronic processors 305 and 405) perform machine learning functions, for example, to determine how to operate to, for example, conserve power in certain circumstances as explained in greater detail below. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using any one or a combination of these approaches, a computer program may ingest, parse, and understand data, and progressively refine algorithms for data analytics.

As noted previously herein, existing RF site controllers may continuously transmit messages (for example, outbound signaling packets (OSPs)) over a control channel for receipt by communication devices within a coverage area of the RF site controller. A communication device may use information included in the OSPs to control resources of the communication device in order to be able to communicate over the communication network 110, for example, with other communication devices 105. For example, the RF site controllers 115 assign timing and/or frequency parameters that are to be used by the communication devices 105 to communicate with each other. In other words, the RF site controllers 115 may manage which traffic channels (in other words, working channels) are used by which communication devices 105 using, for example, time-division multiple access (TDMA) and/or frequency-division multiple access (FDMA).

In some embodiments, the communication network 110 includes one or more control channels and one or more traffic channels (for example, TDMA voice channels, FDMA voice channels, and the like). A communication device 105 communicates bidirectionally with a RF site controller 115 over a control channel to register with the communication network 110 and be able to communicate with other communication devices 105 over the communication network 110 via the traffic channels. For example, upon a communication device 105 being powered on or upon the communication device 105 entering a new coverage area, the communication device 105 engages in communication, via a control channel, with a RF site controller 115 configured to manage communications within the coverage area.

Once the communication device 105 is registered with the RF site controller 115, both the RF site controller 115 and the communication device 105 may continue to engage in communications with each other over the control channel. For example, the RF site controller 115 may continuously broadcast OSPs over the control channel that include a network status broadcast message, a system status broadcast message, an identifier update message (for example, to inform the communication devices 105 of channel characteristics of the RF site controller 115), and the like. Communication devices 105 may continuously monitor for these OSPs and may respond by transmitting inbound signaling messages over the control channel back to the RF site controller 115 (in other words, inbound signaling packets (ISPs)). For example, a communication devices 105 may monitor for the OSPs in order to perform a received signal strength indication (RSSI) sampling to determine a location of the communication device 105 relative to the RF site controller 115 from which the OSPs are received. The continuous exchange of OSPs and ISPs between the RF site controller 115 and the communication devices 105 being served by the RF site controller 115 allows these devices to gather information about each other (for example, status information) to maintain proper functionality of the communication network 110. For example, when the communication device 105 receives an OSP from the RF site controller 115, the communication device 105 is able to determine that the communication device 105 is still within communication range of the RF site controller 115 and that the RF site controller 115 is functioning properly to provide service to the communication device 105. In existing communication systems, when a communication device 105 does not receive continuous OSPs from the RF site controller 115, the communication device 105 may determine that it is out of communication range with the RF site controller 115 or that the RF site controller 115 is malfunctioning and, in response thereto, the communication device 105 may search for an adjacent RF site controller 115 with which to register. In a similar manner, when the RF site controller 115 receives an ISP from the communication device 105, the RF site controller 115 is able to determine that the communication device 105 is still within communication range of the RF site controller 115 and that the communication device 105 is still powered on and able to receive, for example, a call from another communication device 105.

Other information may be included in the OSPs or ISPs in addition to the example information explained above. For example, the ISPs may include location information of the communication device 105 (for example, as determined by a global positioning system (GPS) of the communication device 105). In some embodiments, the RF site controller 115 may use the location information to determine how to manage communication to/from the communication device 105. For example, the RF site controller 115 may determine when to perform handover of management of communication of the communication device 105 to an adjacent RF site controller 115 in response to determining that the communication device 105 is moving away from the current RF site controller 115 and toward an adjacent RF site controller 115.

When the control channel and/or traffic channel(s) are continuously being used for communication, the control channel and/or the traffic channel(s) may be referred to as operating in a keyed state (in other words, being keyed up). In other words, the control channel of the RF site controller 115 may operate in a keyed state in which outbound signaling messages are broadcast by the RF site controller 115 via the transceiver and the antenna (in other words, the third network interface 415) over the control channel and in which inbound signaling messages from the communication devices 105 are receivable by the RF site controller 115 over the control channel. On the other hand, when the control channel and/or traffic channel(s) are not being used for communication, the control channel and/or the traffic channel(s) may be referred to as operating in a de-keyed state (in other words, not being keyed up). In other words, the control channel of the RF site controller may operate in a de-keyed state in which the outbound signaling messages are not transmitted by the RF site controller 115 over the control channel and in which the inbound signaling messages from the communication devices 105 are receivable by the RF site controller 115 over the control channel.

In addition to the functions of the control channel explained above, the control channel is used by the communication devices 105 to transmit call requests to the RF site controller 115. For example, a communication device 105 may transmit a call request to engage in a voice communication such as a voice call with another communication device 105 (for example, in response to a user of the communication device 105 pressing a push-to-talk button on the communication device 105). The RF site controller 115 may respond to the call request by allocating a traffic channel for the call, keying up the allocated traffic channel, and transmitting characteristics of the allocated traffic channel (for example, allocated frequency of traffic channel) to the requesting communication device 105 and the requested communication device 105 via the control channel. In response to receiving the characteristics of the allocated traffic channel via the control channel, the communication devices 105 may engage in communication with each other over the allocated traffic channel in accordance with the characteristics of the allocated traffic channel.

The control channel may also be used to receive a call termination request from either communication device 105. In response to receiving the call termination request, the RF site controller 115 may provide a notification of call termination to the other communication device 105 and may de-key the allocated traffic channel such that the traffic channel becomes available to be used for communication between other communication devices 105.

In some embodiments, requests from the communication devices 105 (for example, call requests, call termination requests, and the like) are referred to as new activity on the communication network 110. In some embodiments, new activity on the communication network 110 may include any request or communication that results in the RF site controller 115 performing an action that changes a communication state of one or more channels of the communication network 110. New activity may also include any change in status of the RF site controller 115 or communication network 110 (for example, detection of a malfunction or error experienced by the RF site controller 115). In some embodiments, new activity may include new call requests but may not include call termination requests.

As noted previously herein, continuous communication of OSPs and ISPs over the control channel(s) (in other words, maintaining the control channel in a keyed state at all times) may be disadvantageous in many situations such as when new activity is not occurring within a coverage area of the RF site controller. For example, a RF site controller consumes excess power while continuously transmitting OSPs even when communication devices in the coverage area have been in the coverage area for some time and are not moving or engaging in new activity (e.g., communication devices are not requesting to engage in a new call). Because the communication devices are not moving or engaging in new activity, the communication devices may not require continuous OSPs to be transmitted by the RF site controller in order to properly access the communication network. In other words, the OSPs and the ISPs being continuously transmitted between the RF site controller and communication devices may include redundant information. Accordingly, there is a technological problem with RF site controllers in that the RF site controllers may consume more power than is necessary to allow a communication network and communication devices associated with the communication network to function properly.

Figure 5:
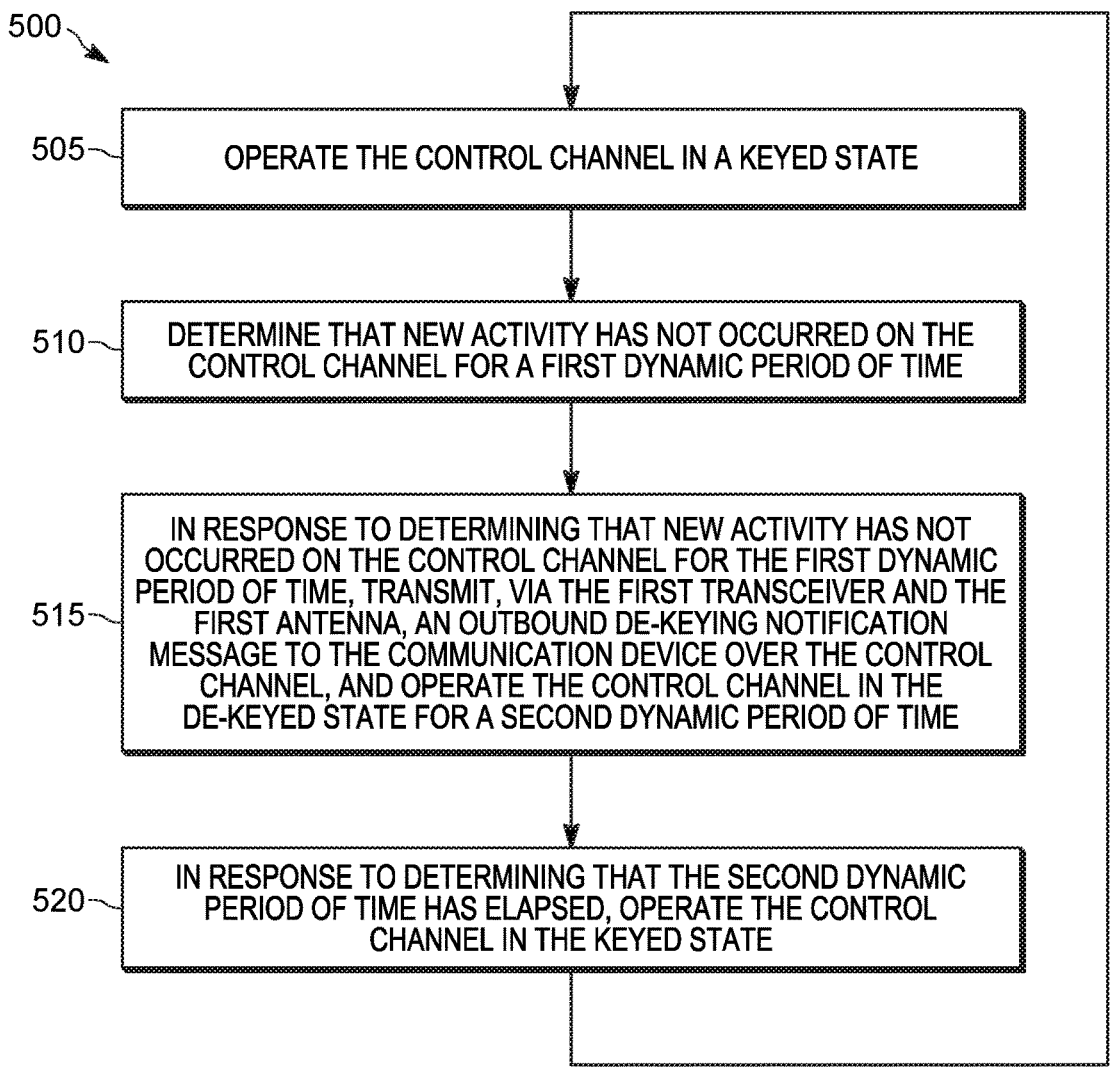
FIG. 5 is a flowchart of a method of adaptively operating a control channel of the RF site controller of FIG. 4 to reduce power consumption that is performed by the RF site controller of FIG. 4 according to one example embodiment.

To address this technological problem, the third electronic processor 405 of the RF site controller 115 may perform a method 500 of FIG. 5 to adaptively operate a control channel of the RF site controller 115 to reduce power consumption/ save energy. Performance of the method 500 may allow the RF site controller 115 to determine that new activity has not occurred on the control channel and repeat the process of (i) broadcasting OSPs for a first dynamic time interval and (ii) refraining from broadcasting OSPs for a second dynamic time interval. Due to the RF site controller 115 periodically refraining from broadcasting OSPs for the second dynamic time interval, the RF site controller 115 consumes less power/saves energy compared to RF site controllers that continuously broadcast OSPs.

FIG. 5 illustrates a flowchart of the method 500 performed by the third electronic processor 405 of the RF site controller 115 to adaptively operate a control channel of the RF site controller 115 to reduce power consumption/save energy. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, the third electronic processor 405 of the RF site controller 115 operates its control channel in a keyed state. In other words, the RF site controller 115 may continuously broadcast OSPs to communication devices 105 located within a coverage area of the RF site controller 115 and may receive ISPs from the communication devices 105 as explained previously herein.

At block 510, the third electronic processor 405 determines that new activity has not occurred on the control channel for a first dynamic period of time. In other words, the RF site controller 115 may determine that it has not received a call request or any communication that resulted in the RF site controller 115 performing an action that changes a communication state of one or more channels of the communication network 110 during the first dynamic period of time. The third electronic processor 405 may also determine that the status of the RF site controller 115 and the communication network 110 has not changed during the first dynamic period of time. In some embodiments, the first dynamic period of time is determined and may be dynamically adjusted based on a characteristic of at least one of a group consisting of a (i) coverage area being serviced by the RF site controller 115 and (ii) one or more communication devices 105 being serviced by the RF site controller 115 as explained in detail below. The first dynamic period of time may be, for example, two seconds, five seconds, ten seconds, or any other amount of time.

At block 515, in response to determining that new activity has not occurred on the control channel for the first dynamic period of time, the third electronic processor 405 transmits, via the third network interface 415 (that includes a transceiver and an antenna), an outbound de-keying notification message to the communication devices 105 over the control channel. The third electronic processor 405 also operates the control channel in the de-keyed state for a second dynamic period of time. The outbound de-keying notification message may be an OSP that is broadcast by the RF site controller 115 to all communication devices 105 within a coverage area of the RF site controller 115. In some embodiments, the outbound de-keying notification message may also be broadcast to other devices in the communication network 110 (for example, communication devices 105 located in coverages areas of adjacent RF site controllers 115, other RF site controllers 115, the call controller 120, and the like). The RF site controller 115 may broadcast the outbound de-keying notification message one or more times (for example, three times) before switching operation of the control channel from the keyed state to the de-keyed state.

When received by a communication device 105 or another device in the communication network 110, the outbound de-keying notification message is configured to indicate that the control channel of the RF site controller 115 will be switched to the de-keyed state for the second dynamic period of time. In response to receiving the outbound de-keying notification message, the communication device 105 (in particular, the first electronic processor 205) may be configured to store identification information of the control channel (for example, a frequency of the control channel) and prevent the communication device 105 from sampling for other RF site controllers 115 during the second dynamic period of time. In other words, the outbound de-keying notification message notifies the communication devices 105 that a future absence of continuous OSPs from the RF site controller 115 is expected and that the communication devices 105 should not operate as they typically may to sample for other RF site controllers 115 in response to the absence of OSPs from the RF site controller 115. In some embodiments, the outbound de-keying notification message includes the second dynamic period of time to allow the communication devices 105 to determine an amount of time that it is expected that the RF site controller 115 will not broadcast OSPs over the control channel. If the communication devices 105 determine the absence of OSPs from the RF site controller 115 after the second dynamic period of time has elapsed, the communication devices 105 may then determine that the communication devices 105 should sample for other RF site controllers 115 (for example, because the communication devices 105 are out of communication range with the RF site controller 115, because the RF site controller 115 is malfunctioning, or the like). Due to the above-described function/purpose of the outbound de-keying notification message, in some embodiments, the outbound de-keying notification message may be referred to as a Motorola Adjacent Site Search Hold-off (MASSH) message/OSP.

Similar to the first dynamic period of time, in some embodiments, the second dynamic period of time is determined and may be dynamically adjusted based on a characteristic of at least one of a group consisting of (i) a coverage area being serviced by the RF site controller 115 and (ii) one or more communication devices 105 being serviced by the RF site controller 115 as explained in detail below. The second dynamic period of time may be, for example, two seconds, five seconds, nine seconds, or any other amount of time. In some embodiments, the second dynamic period of time may include a maximum value that defines a maximum amount of time that the control channel of the RF site controller 115 may be operated in the de-keyed state before switching back to the keyed state. For example, the maximum value may be nine seconds but may be higher or lower in other embodiments depending on the requirements/specification of the communication network 110 and/ or the communication devices 105.

At block 515, the third electronic processor 405 also switches operation of the control channel of the RF site controller 115 from the keyed state to the de-keyed state and operates the control channel in the de-keyed state for the second dynamic period of time. As explained previously herein, when the control channel is operated in the de-keyed state during the second dynamic period of time, the RF site controller 115 does not broadcast OSPs as a typical RF site controller may. In some embodiments, refraining from broadcasting OSPs for the second dynamic period of time allows the RF site controller 115 and/or the communication devices 105 being serviced by the RF site controller 115 to conserve energy/save power compared to a system that implements continuous broadcasting of OSPs. In other words, the RF site controller 115 may consume more power when operating in the keyed state than when operating in the de-keyed state (for example, three to four times as much power) because the RF site controller 115 does not broadcast OSPs when the control channel is operated in the de-keyed state. Similarly, the communication devices 105 may deactivate monitoring of OSPs for the duration of the second dynamic period of time in response to receiving the outbound de-keying notification message from the RF site controller 115. Such deactivation of monitoring for OSPs (for example, suspending received signal strength indication (RSSI) sampling) may allow the communication devices 105 to conserve energy/save power compared to continuously monitoring for OSPs.

In some embodiments, when the control channel is operated in the de-keyed state, one or more traffic channels continue to operate in the keyed state such that the one or more traffic channels continue to be available to allow communication devices 105 to communicate with each other over the one or more traffic channels. For example, at block 515, the third electronic processor 405 may determine that new activity has not occurred on the control channel of the RF site controller 115 even when calls are currently taking place over one or more traffic channels. In other words, in some embodiments, de-keying the control channel does not affect operation of one or more traffic channels that may remain in their current operational state (keyed or de-keyed) at the time the control channel is de-keyed.

Even though operating the control channel in the de-keyed state results in the RF site controller 115 and the communication devices 105 refraining from continuously exchanging OSPs and ISPs with each other, communication between the RF site controller 115 and the communication devices 105 may nevertheless be possible. In some embodiments, because the communication devices 105 have previously stored the identification information of the control channel included in the outbound de-keying notification message, the communication devices 105 are able to transmit ISPs to the RF site controller 115 even when the control channel of the RF site controller 115 is de-keyed. For example, a communication device 105 may transmit a call request or a call termination request to the RF site controller 115 while the control channel is operating in the de-keyed state.

In response to receiving a call request ISP from the communication device 105, the RF site controller 115 may switch the control channel from operating in the de-keyed state to operating in the keyed state. In other words, when the control channel is operating in the de-keyed state, in response to the RF site controller 115 receiving one or more inbound signaling messages from the communication device 105 prior to the second dynamic period of time elapsing, the third electronic processor 405 may be configured to switch the control channel from operating in the de-keyed state to operating in the keyed state prior to the second dynamic period of time elapsing. Once the control channel is operating in the keyed state, the RF site controller 115 may allocate a traffic channel for communication in accordance with the call request from the communication device 105.

As another example, in response to receiving a call termination request ISP from the communication device 105 when the control channel of the RF site controller 115 is in the de-keyed state, the RF site controller 115 may transmit an OSP message similar to the outbound de-keying notification message to the communication devices 105 involved in the call that was requested to be terminated. Such an OSP message may be transmitted to the communication devices 105 multiple times by the RF site controller 115, for example, over the traffic channel. Based on the outbound de-keying notification message, the communication devices 105 may store the identification information of the control channel included in the outbound de-keying notification message and may refrain from sampling for other RF site controllers 115 when the call is terminated until the second dynamic period of time has expired. The communication devices 105 may also switch from the traffic channel over which communication was previously occurring to the control channel such that the communication devices 105 may transmit ISPs over the control channel and/or monitor for OSPs over the control channel as explained previously herein. After transmitting the outbound de-keying notification message one or more times to the communication devices 105, the RF site controller 115 may send a call termination message/OSP to the communication devices 105 involved in the call and may de-key the allocated traffic channel such that the traffic channel becomes available to be used for communication between other communication devices 105. In other words, the immediately-above description explains the functionality of the RF site controller 115 and the communication devices 105 in a situation when a call that is occurring over a traffic channel is requested to be terminated during the second dynamic period of time when the control channel of the RF site controller 115 is in the de-keyed state according to one example embodiment.

At block 520, the third electronic processor 405 determines that the second dynamic period of time has elapsed, and in response thereto, the third electronic processor 405 operates the control channel in the keyed state. In other words, the third electronic processor 405 switches operation of the control channel from the de-keyed state to the keyed state such that the RF site controller 115 continuously broadcasts OSPs to the communication devices 105 within the coverage area of the RF site controller 115. As indicated by FIG. 5, the method 500 proceeds back to block 505 and repeats blocks 505 through 520. Through repetitive performance of the method 500, the state of the control channel of the RF site controller 115 is controlled according to a duty cycle. For example, the control channel is controlled to operate in the keyed state for a first dynamic period of time and to operate in the de-keyed state for a second dynamic period of time. Additionally, the duty cycle is adaptable/dynamic in that the first dynamic period of time corresponding to the keyed state and the second dynamic period of time corresponding to the de-keyed state may be adjusted, for example, based on real-time monitored characteristics of the coverage area and/or of communication devices 105 as indicated by the below examples.

Figure 6:
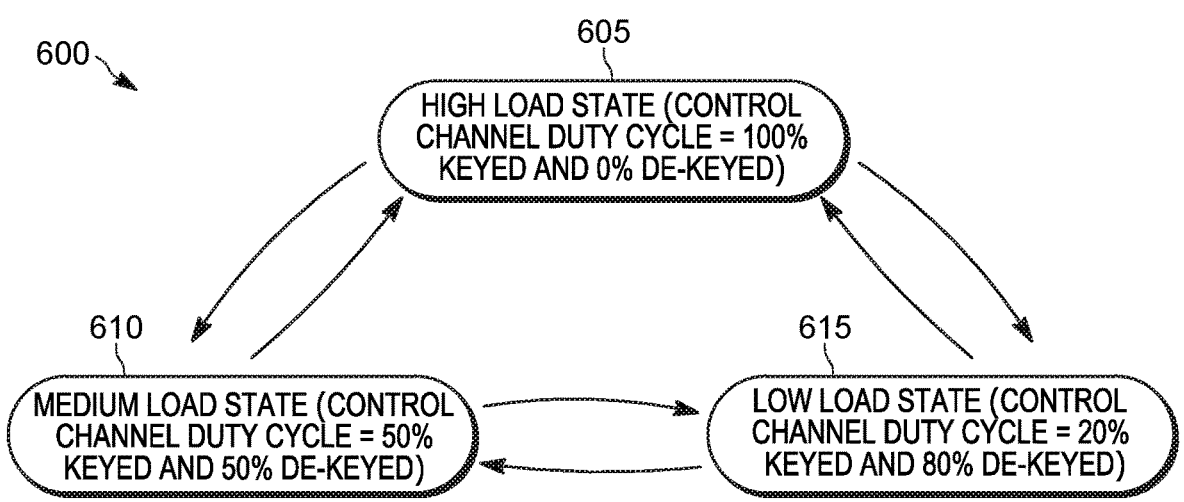
FIG. 6 is a state diagram illustrating three example states in which the RF site controller of FIG. 4 may operate to control a duty cycle of a state of the control channel of the RF site controller of FIG. 4 according to one example embodiment.

In some embodiments, the duty cycle of the state of the control channel includes three distinct states as shown in the state diagram 600 of FIG. 6: a high load state 605 in which the duty cycle is 100% keyed and 0% de-keyed; a medium load state 610 in which the duty cycle is 50% keyed and 50% de-keyed; and a low load state 615 in which the duty cycle is 20% keyed and 80% de-keyed. The number of states and duty cycles are merely examples. More or fewer states are possible, and different duty cycles for each state are also possible.

Additionally, in some embodiments, the duty cycle of the state of the control channel may not be categorized into and controlled using distinct states. Rather, one or more devices in the communication network 110 may utilize a scoring algorithm to receive data inputs (such as the characteristics of at least one of a group consisting of a coverage area being serviced by the RF site controller 115 and one or more communication devices 105 being serviced by the RF site controller 115 explained below) and dynamically determine the duty cycle based on the data inputs as the data inputs change. For example, one or more devices in the communication network 110 (for example, an RF site controller 115) use machine learning to determine the duty cycle of the state of the control channel. For example, a machine learning engine may be trained using historical data indicating desired duty cycles in previous situations with similar characteristics of the coverage area and the communication devices 105. A trained machine learning engine may then use current data inputs to determine a duty cycle, and set the durations of the first dynamic period of time and the second dynamic period of time accordingly.

For the sake of brevity, the manner in which the duty cycle is determined is explained below with respect to the three distinct state example provided above and shown in FIG. 6. In some embodiments, a default state for any one of the RF site controllers 115 is the low load state 615.

The lengths of the first dynamic period of time and the second dynamic period of time (in other words, the duty cycle of the state of the control channel of the RF site controller 115) may be determined in many different manners. As noted previously herein, the lengths of one or both of these periods of time is determined and may be dynamically adjusted based on a characteristic of at least one of a group consisting of (i) a coverage area being serviced by the RF site controller 115 and (ii) one or more communication devices 105 being serviced by the RF site controller 115. In some embodiments, such a characteristic includes at least one of a group consisting of a location of an incident within the coverage area of the RF site controller 115, an emergency status of communication occurring using one or more communication devices 105 within the coverage area of the RF site controller 115, and a status of a sensor of one or more communication devices 105 within the coverage area of the RF site controller 115.

As an example of the characteristic that impacts the duty cycle of the state of the control channel including a location of an incident within the coverage area of the RF site controller 115, the RF site controller 115 may enter the high load state 605 in response to determining that a public safety incident is occurring within a geofence defined by the coverage area of the RF site controller 115. For example, a public safety officer at a public safety dispatch center may enter a location of a reported incident into a dispatch console configured to communicate with the call controller 120. In response to receiving the location of the incident, the call controller 120 may communicate with one or more RF site controllers 115 whose coverage area overlaps with the location of the incident (in other words, is located within the geofence) to instruct the one or more RF site controllers 115 to enter the high load state 605 in response to a public safety incident occurring within the coverage area (in other words, within the geofence).

In some embodiments, the RF site controller 115 determines that the incident is occurring within its coverage area on its own. For example, a communication device 105 being serviced by the RF site controller 115 may include information in an ISP transmitted to the RF site controller 115 indicating that an incident is occurring at the location of the communication device 105. In some embodiments, the location of the communication device 105 may also be included in the information in the ISP. In some embodiments, the RF site controller 115 may receive information from the call controller 120 (for example, information that indicates a public safety incident is occurring within the coverage area of the RF site controller 115), but the RF site controller 115 makes the determination of which state of FIG. 6 to enter itself rather than receiving an explicit instruction from the call controller 120 to enter a certain state 605, 610, 615. In other words, the RF site controller 115 may remotely receive at least one of a group consisting of the first dynamic period of time, the second dynamic period of time, and a characteristic that impacts determination of the duty cycle of the state of the control channel from the call controller 120 and/or one or more communication devices 105. The immediately-above explanation of the source of the received characteristic(s) that impacts determination of the duty cycle also applies to the other example characteristics explained herein.

In some embodiments, public safety incidents include incidents in which public safety officers may be called to provide assistance in resolving or preventing a societal or environmental problem (for example, a location where a suspect is committing or has committed a crime, a fire, a vehicular accident, a traffic stop, a location where a natural disaster such as a tornado or earthquake has occurred, and the like). In some embodiments, public safety incidents include incidents involving public service agencies (for example, waste disposal agencies, water management agencies, and the like). In some embodiments, public safety officers include police officers, paramedics, firefighters, dispatchers, and the like. In some embodiments, public safety officers include public service employees employed by public service agencies.

As an example of the characteristic that impacts the duty cycle of the state of the control channel including an emergency status of communication occurring using a communication device 105 within the coverage area of the RF site controller 115, the RF site controller 115 may enter the high load state 605 in response to determining that a user (for example, a public safety officer) of a communication device 105 initiated an emergency alarm. For example, such an alarm may be initiated by a user entering a predetermined code on a user interface of the communication device 105. As another example, the user may request emergency assistance via a voice call, and the dispatch center may notify the call controller 120 of the request for emergency assistance. In some embodiments, initiation of an emergency alarm may indicate a severity level of the incident. For example, a traffic stop for speeding may have a low severity level until a public safety officer engaging in the traffic stop initiates the emergency alarm which may cause the severity level of the incident to increase to a high severity level. In some embodiments, the severity level of the incident and/or a type of the incident is a characteristic that impacts the duty cycle of the state of the control channel. For example, in response to determining that the initial low severity traffic stop incident is occurring within the coverage area of the RF site controller 115, the RF site controller 115 may exit the default low load state 615 and enter the medium load state 610. Then, in response to the severity level of the traffic stop escalating to high severity based on the user initiation of the emergency alarm, the RF site controller 115 may exit the medium load state 610 and enter the high load state 605. As another example, when the incident within the coverage area has a high severity level (for example, a bomb threat, a large fire, an evacuation, and the like) or when a threshold number of incidents (for example, two or more) are occurring within the coverage area, the RF site controller 115 may exit the low load state 615 and immediately enter the high load state 605.

As an example of the characteristic that impacts the duty cycle of the state of the control channel including a status of a sensor of a communication device 105 within the coverage area of the RF site controller 115, the RF site controller 115 may change load states 605, 610, and 615 in response to different sensors of the communication device 105 being triggered. For example, the RF site controller 115 may enter the high load state 605 in response to determining that a sensor indicating at least one of a group consisting of a gun being fired (for example, based on detection by the microphone 225), a gun being drawn from a holster (for example, based on detection by a holster sensor), a protective vest detecting an impact of a bullet, and the like. As another example, the RF site controller 115 may enter the medium load state 610 in response to determining that a sensor indicating a less severe event has been triggered (for example, a Taser being drawn from a holster as detected by a holster sensor, yelling/shouting being detected by the microphone 225, and the like).

In some embodiments, the characteristic that impacts the duty cycle of the state of the control channel includes at least one of a group consisting of an amount of communication devices 105 within the coverage area, an amount of communication traffic occurring over the traffic channels of the RF site controller 115, a historic peak activity time window of the coverage area of the RF site controller 115, and a historic non-peak activity time window of the coverage area of the RF site controller 115. For example, when the amount of communication devices 105 located within the coverage area of the RF site controller 115 (in other words, a geofence defined by the coverage area) exceeds a first threshold (for example, ten communication devices 105), the RF site controller 115 operates in the high load state 605. When the amount of communication devices 105 located within the coverage area is less than the first threshold but greater than a second, lower threshold (for example, five communication devices 105), the RF site controller 115 may operate in the medium load state 610. When the amount of communication devices 105 located within the coverage area is less than the second, lower threshold, the RF site controller 115 may operate in the low load state 615. Similar thresholds may be used to monitor the amount of communication traffic occurring over the traffic channels of the RF site controller 115. In other words, the state 605, 610, 615 of the RF site controller 115 may be determined based on the number of currently-active traffic channels allocated by the RF site controller 115 and/or the number of call requests exceeding either a first threshold or a second, lower threshold.

In other embodiments, the state 605, 610, 615 of the RF site controller 115 may be determined based historical peak activity time windows and non-peak activity time windows of traffic over the communication network 110. For example, the RF site controller 115, the call controller 120, and/or another device in the communication network 110 determines that peak activity time windows include Monday through Friday from 7 PM until 11 PM while non-peak activity time windows include Sunday through Thursday from 2 AM until 5 AM. Based on these historical activity time windows, the RF site controller 115 may enter the high load state 605 on Monday through Friday between 7 PM and 11 PM while entering the low load state 615 on Sunday through Thursday between 2 AM and 5 AM. While the machine learning capabilities of the RF site controller 115 may be used with respect to any of the examples included herein, the machine learning capabilities may be useful with respect to this peak and non-peak time window example to determine which times have been historically peak times and non-peak times.

As yet another example, the RF site controller 115 may remain in the default low load state 615 in the absence of any of the above example characteristics that indicate that the RF site controller 115 should enter the medium load state 610 or the high load state 605. Additionally, the RF site controller 115 may exit one of the states 610, 615 and enter the low load state 615 in response to determining that an incident within the coverage area has been resolved and any follow-up investigation within the coverage area has also been completed/resolved. As another example, the RF site controller 115 may exit the high load state 605 and enter the medium load state 610 in response to an incident within the coverage area being downgraded from an "emergency" to being a "non-emergency" (for example, as entered into a communication device 105 by a public safety officer at the incident scene, as determined by a dispatcher at a dispatch center, and/or the like).

As illustrated by the above examples of characteristics that may impact the duty cycle of the state of the control channel of the RF site controller 115, the state of the duty cycle is based on the likelihood of new activity occurring on the control channel at a given time. For example, when more communication devices 105 are present in the coverage area or when a high severity public safety incident is occurring in the coverage area, the control channel of the RF site controller 115 servicing the coverage area is more likely to experience new activity (for example, new call requests and the like). In addition to these example requests, some communication devices 105 may utilize received signal strength indication (RSSI) sampling using OSPs that are continuously broadcast by the RF site controller 115 to determine location information about themselves (for example, to determine a location of the communication device 105 relative to the RF site controller 115 from which the OSPs are received). However, as indicated previously herein, when the control channel of the RF site controller 115 is operating in the de-keyed state, the RF site controller 115 does not broadcast OSPs and, therefore, communication devices 105 may be unable to utilize RSSI sampling to determine their location. In many situations, the inability to use RSSI sampling for the second dynamic period of time (in other words, the de-keyed time period) does not negatively affect the functionality of the communication devices 105 (for example, when a communication device 105 is moving slowly or not moving at all, when the exact location of the communication device 105 is not important information, or the like). However, in some situations, it may be beneficial for one or more RF site controllers 115 to enter the high load state 605 based on a characteristic of one or more communication devices 105 that are configured to be fast-moving communication devices 105 that utilize RSSI sampling.

In some embodiments, a fast-moving communication device 105 is any portable/mobile communication device 105 that is capable of being transported above a certain speed (for example, ten miles per hour, twenty miles per hour, or the like). For example, a smart phone may be considered a fast-moving communication device 105 when the smart phone is located in a vehicle that is traveling above the certain speed.

In some embodiments, the RF site controller 115 determines in which state 605, 610, 615 to operate based on at least one of a group consisting of (i) an amount of fast-moving communication devices 105 within the coverage area or within a predetermined distance of the coverage area and configured to utilize RSSI sampling and (ii) a direction of movement toward the coverage area of a fast-moving communication device 105 that is currently outside the coverage area and that is configured to utilize RSSI sampling. For example, when the amount of fast-moving communication devices 105 located within a geofence including the coverage area and an area within a predetermined distance of the coverage area exceeds a threshold (for example, one fast-moving communication device 105, three fast-moving communication devices 105, or the like), the RF site controller 115 operates in the high load state 605. As another example, when a fast-moving communication device 105 is within the coverage area of the first RF site controller 115A but currently traveling away from the first RF site controller 115A and toward the second RF site controller 115B (for example, near the edge of the coverage area of the first RF site controller 115A), the second RF site controller 115B may begin operating in the high load state 605 in preparation for the arrival of the fast-moving communication device 105 within the coverage area of the second RF site controller 115B. In some embodiments, the second RF site controller 115B may be informed of the incoming fast-moving communication device 105 via communication from the first RF site controller 115A, the call controller 120, and/or the like. When the RF site controllers 115 are operated in the high load state 605 to operate the control channel in the keyed state at all times, fast-moving communication devices 105 configured to utilize RSSI sampling using broadcasted OSPs from the RF site controllers 115 may operate without disruption.

In a similar manner as explained with respect to the above example, when an incident is determined to be occurring in a coverage area of an RF site controller 115, in addition to the RF site controller 115 itself operating in the high load state 605, multiple other RF site controllers 115 along one or more likely paths of travel from a public safety commend center (for example, a police station, a fire station, a hospital, or the like) to the incident location may operate in the high load state 605 in preparation for likely arrival fast-moving communication devices 105 through their respective coverage areas. In other words, a geofence may be defined, for example by the call controller 120, around the incident and the likely travel paths between the incident and one or more public safety command centers. The RF site controllers 115 that have coverage areas included within the geofence may be operated in the high load state 605.

Accordingly, the method 500 allows an RF site controller 115 to conserve power by, at some times, operating its control channel in the keyed state in a non-continuous manner while still maintaining the functionality of the communication network 110 by (i) periodically and adaptively/dynamically re-entering the keyed state based on characteristics of the coverage area or a communication device 105 being serviced by the RF site controller 115 or (ii) by re-entering the keyed state upon receiving a request from a communication device 105 to do so.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency (RF) site controller comprising:
   a first transceiver;
   a first antenna; and
   a first electronic processor, wherein the RF site controller is configured to communicate with a first communication device over a control channel to establish a traffic channel over which the first communication device is configured to communicate with a second communication device;
   wherein the first electronic processor is configured to control the RF site controller such that the control channel operates in either
      (i) a keyed state in which outbound signaling messages are broadcast by the RF site controller via the first transceiver and the first antenna over the control channel and in which inbound signaling messages from the first communication device are receivable by the RF site controller over the control channel, or
      (ii) a de-keyed state in which the outbound signaling messages are not transmitted by the RF site controller over the control channel and in which the inbound signaling messages from the first communication device are receivable by the RF site controller over the control channel;
   wherein the first electronic processor is configured to
      (a) operate the control channel in the keyed state,
      (b) determine that new activity has not occurred on the control channel for a first dynamic period of time,
      (c) in response to determining that new activity has not occurred on the control channel for the first dynamic period of time, transmit, via the first transceiver and the first antenna, an outbound de-keying notification message to the first communication device over the control channel, and operate the control channel in the de-keyed state for a second dynamic period of time, and
      (d) in response to determining that the second dynamic period of time has elapsed, operate the control channel in the keyed state; and
   wherein at least one of the first dynamic period of time and the second dynamic period of time is based on a characteristic of at least one of a group consisting of a coverage area being serviced by the RF site controller and one or more communication devices being serviced by the RF site controller.

2. The RF site controller of claim 1, wherein the outbound de-keying notification message includes the second dynamic period of time; and
   wherein in response to receiving the outbound de-keying notification message via a second transceiver and a second antenna of the first communication device, a second electronic processor of the first communication device is configured to store identification information of the control channel included in the outbound de-keying notification message and prevent the first communication device from sampling for other RF site controllers during the second dynamic period of time.

3. The RF site controller of claim 1, wherein at least one of a group consisting of the characteristic, the first dynamic period of time, and the second dynamic period of time is remotely received from a call controller configured to control a plurality of RF site controllers.

4. The RF site controller of claim 1, wherein the characteristic includes at least one of a group consisting of a location of an incident within the coverage area, an emergency status of communication occurring using the one or more communication devices being serviced by the RF site controller, and a status of a sensor of the one or more communication devices being serviced by the RF site controller.

5. The RF site controller of claim 1, wherein the characteristic includes at least one of a group consisting of an amount of communication devices within the coverage area, an amount of communication traffic occurring over the traffic channels of the RF site controller, a historic peak activity time window of the coverage area, and a historic non-peak activity time window of the coverage area.

6. The RF site controller of claim 1, wherein the RF site controller consumes more power when the control channel operates in the keyed state than when the control channel operates in the de-keyed state.

7. The RF site controller of claim 1, wherein when the control channel operates in the de-keyed state, the traffic channel continues to be available such that the first communication device is configured to communicate with the second communication device over the traffic channel.

8. The RF site controller of claim 1, wherein when the control channel operates in the de-keyed state, in response to the RF site controller receiving one or more of the inbound signaling messages from the first communication device prior to the second dynamic period of time elapsing, the first electronic processor is configured to switch the control channel from operating in the de-keyed state to operating in the keyed state prior to the second dynamic period of time elapsing.

9. The RF site controller of claim 1, wherein the first electronic processor is configured to repeat tasks (a)-(d).

10. The RF site controller of claim 1, wherein the characteristic includes at least one of a group consisting of (i) an amount of fast-moving communication devices within the coverage area or within a predetermined distance of the coverage area and configured to utilize received signal strength indication (RSSI) sampling and (ii) a direction of movement toward the coverage area of a fast-moving communication device that is currently outside the coverage area and that is configured to utilize RSSI sampling.

11. A method of operating a radio frequency (RF) site controller, the method comprising:

operating, with a first electronic processor of the RF site controller, a control channel of the RF site controller in a keyed state in which outbound signaling messages are broadcast by the RF site controller via a first transceiver and a first antenna over the control channel to a first communication device and in which inbound signaling messages from the first communication device are receivable by the RF site controller over the control channel, wherein the first electronic processor is configured to establish a traffic channel over which the first communication device is configured to communicate with a second communication device based on communication with the first communication device over the control channel;

determining, with the first electronic processor, that new activity has not occurred on the control channel for a first dynamic period of time;

in response to determining that new activity has not occurred on the control channel for the first dynamic period of time, transmitting, via the first transceiver and the first antenna, an outbound de-keying notification message to the first communication device over the control channel, and operating the control channel in a de-keyed state for a second dynamic period of time, wherein when the control channel is operated in the de-keyed state, the outbound signaling messages are not transmitted by the RF site controller over the control channel and the inbound signaling messages from the first communication device are receivable by the RF site controller over the control channel; and in response to determining that the second dynamic period of time has elapsed, operating, with the first electronic processor, the control channel in the keyed state;

wherein at least one of the first dynamic period of time and the second dynamic period of time is based on a characteristic of at least one of a group consisting of a coverage area being serviced by the RF site controller and one or more communication devices being serviced by the RF site controller.

12. The method of claim 11, wherein the outbound de-keying notification message includes the second dynamic period of time, and further comprising:

receiving, via a second transceiver and a second antenna of the first communication device, the outbound de-keying notification message from the RF site controller; and in response to receiving the outbound de-keying notification message,
storing, with a second electronic processor of the first communication device, identification information of the control channel included in the outbound de-keying notification message, and
preventing, with the second electronic processor, the first communication device from sampling for other RF site controllers during the second dynamic period of time.

13. The method of claim 11, wherein the characteristic includes at least one of a group consisting of a location of an incident within the coverage area, an emergency status of communication occurring using the one or more communication devices being serviced by the RF site controller, and a status of a sensor of the one or more communication devices being serviced by the RF site controller.

14. The method of claim 11, wherein the characteristic includes at least one of a group consisting of an amount of communication devices within the coverage area, an amount of communication traffic occurring over the traffic channels of the RF site controller, a historic peak activity time window of the coverage area, and a historic non-peak activity time window of the coverage area.

15. The method of claim 11, wherein operating the control channel in the keyed state consumes more power than operating the control channel in the de-keyed state.

16. The method of claim 11, further comprising when operating the control channel in the de-keyed state, operating the traffic channel in a keyed state such that the traffic channel continues to be available to allow the first communication device to communicate with the second communication device over the traffic channel.

17. The method of claim 11, further comprising when operating the control channel in the de-keyed state,
receiving, via the first transceiver and the first antenna of the RF site controller, one or more of the inbound signaling messages from the first communication device prior to the second dynamic period of time elapsing; and
in response to the RF site controller receiving the one or more of the inbound signaling messages from the first communication device prior to the second dynamic period of time elapsing, switching, with the first electronic processor, the control channel from operating in the de-keyed state to operating in the keyed state prior to the second dynamic period of time elapsing.

18. The method of claim 11, wherein the characteristic includes at least one of a group consisting of (i) an amount of fast-moving communication devices within the coverage area or within a predetermined distance of the coverage area and configured to utilize received signal strength indication (RSSI) sampling and (ii) a direction of movement toward the coverage area of a fast-moving communication device that is currently outside the coverage area and that is configured to utilize RSSI sampling.

19. A communication system comprising:
a radio frequency (RF) site controller including
a first transceiver,
a first antenna, and
a first electronic processor, wherein the RF site controller is configured to communicate with a first communication device over a control channel to establish a traffic channel over which the first communication device is configured to communicate with a second communication device,
wherein the first electronic processor is configured to control the RF site controller such that the control channel operates in either
(i) a keyed state in which outbound signaling messages are broadcast by the RF site controller via the first transceiver and the first antenna over the control channel and in which inbound signaling messages from the first communication device are receivable by the RF site controller over the control channel, or
(ii) a de-keyed state in which the outbound signaling messages are not transmitted by the RF site controller over the control channel and in which the inbound signaling messages from the first communication device are receivable by the RF site controller over the control channel,
wherein the first electronic processor is configured to
(a) operate the control channel in the keyed state, (b) determine that new activity has not occurred on the control channel for a first dynamic period of time,
(c) in response to determining that new activity has not occurred on the control channel for the first dynamic period of time, transmit, via the first transceiver and the first antenna, an outbound de-keying notification message to the first communication device over the control channel, and operate the control channel in the de-keyed state for a second dynamic period of time, and
(d) in response to determining that the second dynamic period of time has elapsed, operate the control channel in the keyed state, and
wherein at least one of the first dynamic period of time and the second dynamic period of time is based on a characteristic of at least one of a group consisting of a coverage area being serviced by the RF site controller and one or more communication devices being serviced by the RF site controller, and
wherein the outbound de-keying notification message includes the second dynamic period of time; and the first communication device including
a second transceiver,
a second antenna, and
a second electronic processor configured to
receive, via the second transceiver and the second antenna, the outbound de-keying notification message from the RF site controller, and
in response to receiving the outbound de-keying notification message,
store identification information of the control channel included in the outbound de-keying notification message, and
prevent the first communication device from sampling for other RF site controllers during the second dynamic period of time.

20. The communication system of claim 19, wherein the characteristic includes at least one of a group consisting of a location of an incident within the coverage area, an emergency status of communication occurring using the one or more communication devices being serviced by the RF site controller, and a status of a sensor of the one or more communication devices being serviced by the RF site controller.

* * * * *